United States Patent
Anderson

[11] 3,851,795
[45] Dec. 3, 1974

[54] METHOD AND APPARATUS FOR DISPENSING SEMI-FLUID MATERIAL

[76] Inventor: Ralph F. Anderson, 332 Calvin Park Blvd., Rockford, Ill. 61107

[22] Filed: June 25, 1973

[21] Appl. No.: 372,972

[52] U.S. Cl. .................... 222/1, 100/268, 141/12, 222/255, 222/366
[51] Int. Cl. .................................. G01f 11/02
[58] Field of Search ....... 222/1, 255, 256, 252, 260, 222/262, 265, 275, 309, 361, 366; 141/12, 71; 100/50, 268

[56] References Cited
UNITED STATES PATENTS

| | | | |
|---|---|---|---|
| 595,942 | 12/1897 | Diehl | 222/255 X |
| 2,315,162 | 3/1943 | Rasmussen | 222/255 |
| 2,642,797 | 6/1953 | Peters | 100/268 X |
| 2,893,609 | 7/1959 | Spiess | 222/361 X |

Primary Examiner—Robert B. Reeves
Assistant Examiner—Thomas E. Kocovsky
Attorney, Agent, or Firm—Morsbach & Pillotte

[57] ABSTRACT

A method and apparatus for dispensing generally gravimetrically uniform charges of semi-fluid material containing gaseous occlusions in varying amounts utilizing a volumetric-type dispenser in which the material containing the gaseous occlusions is fed under pressure into a measuring cylinder during the intake stroke of the measuring piston and until the pressure reaches a preselected pressure substantially above atmospheric pressure at the end of the intake stroke; the flow of material to the measuring cylinder is then shut off and the measuring cylinder thereafter communicated with an atmospherically vented receiver while moving the piston through a discharge stroke back to its initial position whereby the volume of material dispensed at atmospheric pressure into the receiver exceeds the preselected volumetric displacement of the piston during its intake stroke by an amount that increases and decreases respectively with increases and decreases in the amount of gaseous occlusions in the material supplied to the measuring cylinder. The pressure to which the material is compressed at the end of the intake stroke of the piston is set in relation to the stroke of the piston and the total volume in the measuring cylinder at the end of the intake stroke of the piston to control the amount of expansion of the material in the measuring cylinder when it is vented to atmosphere in such a manner as to minimize changes in the weight of the material dispensed due to variations in the amout of gaseous occlusions in the material.

23 Claims, 10 Drawing Figures

METHOD AND APPARATUS FOR DISPENSING SEMI-FLUID MATERIAL

BACKGROUND OF THE INVENTION

In the packaging of certain semi-fluid materials such as cottage cheese, difficulties have been encountered in maintaining an accurate fill by weight utilizing a volumetric-type filler. It is common practice to utilize a volumetric filler of the type having a measuring cylinder and a piston reciprocable in the cylinder which is operable to draw a charge of material in from a hopper and to thereafter discharge a measured volume of material into a receptacle. When utilizing such volumetric dispensers for dispensing material such as cottage cheese, variations of the order of 28 to 35 grams and more were encountered in filling 1-pound containers. In order to assure compliance with the minimum weight requirements, it is necessary to adjust such fillers so as to dispense a volume corresponding to the minimum weight under the most adverse conditions. This results in a substantial overfill of most containers and is uneconomical.

It is believed that the major portion of the weight variations that occur in volumetrically dispensing cottage cheese and the like is due to the varying amounts of gas contained in the cottage cheese. It has been found that cottage cheese, when compressed, will reexpand and this is considered to be due to the gaseous occlusions in the cottage cheese. Some gaseous occlusions between the curds can be visibly perceived and may be due to entrapment of air in the cottage cheese during the processing and subsequent handling prior to packaging. However, it is also believed that the gaseous occlusions may be present in the cottage cheese and even in the curd, as a consequence of the processing of the milk into cottage cheese. The texture of cottage cheese both as to size of curd and amount of liquid in the cottage cheese varies, and it is considered that these variations affect the gaseous occlusions in the cottage cheese, particularly the size and amount of the gas bubbles between the curds, and that these factors contribute to the rather wide fluctuations in weight that occur when volumetrically dispensing cottage cheese at atmospheric pressure. However, similar problems, although of a lesser magnitude, are encountered with other viscous materials which contain gaseous occlusions such as mayonnaise, cream cheese and the like.

It has heretofore been proposed in the U.S. Pat. to Henry Borgardt and Ronald E. Miller No. 2,854,170, dated Sept. 30, 1958, to dispense viscous material such as cream cheese and mayonnaise with a volumetric-type filler. As disclosed in that patent, a volume of material is drawn into a measuring cylinder from a supply hopper and then a portion of the material in the measuring cylinder is forced back into the supply hopper while shutting off communication between the measuring cylinder and the supply hopper, for the described purpose of conditioning the viscous material to substantially reduce or eliminate air from the material. While the above patent does theorize that the forcing of some material from the dispensing cylinder back into the hopper creates a pressure on the material in the closed sleeve to compress air bubbles present in the area, the actual pressure which could be produced in the apparatus disclosed would be very low, and no more than a few pounds per square inch.

SUMMARY OF THE INVENTION

The present invention relates to a method and apparatus for dispensing generally gravimetrically uniform charges of semi-fluid material containing gaseous occlusions in varying amounts utilizing a volumetric-type dispenser having a measuring cylinder and a measuring piston movable in the cylinder. The material containing gaseous occlusions is fed into the measuring cylinder during the intake stroke of the measuring piston until the pressure in the measuring cylinder reaches a preselected pressure substantially above atmospheric, and the flow of material into the measuring cylinder is shut off at the end of the intake stroke of the piston and while the material in the cylinder is under the preselected super-atmospheric pressure. Thereafter, the measuring cylinder is communicated with an atmospherically vented receiver and the piston is moved through a discharge stroke back to its initial position. Since the material in the measuring cylinder is under a preselected super-atmospheric pressure at the end of the intake stroke, the material in the cylinder will expand when the pressure is thereafter reduced to atmospheric pressure, and the amount of expansion of the material will be correlative with the amount of the gaseous occlusions in the material.

The weight of the material containing gaseous occlusions dispensed by a volumetric filler operating at atmospheric pressure will decrease in proportion to the amount of gaseous occlusions in the material. However when the material containing gaseous occlusions is compressed, the material will reexpand, when the pressure is reduced to atmospheric pressure, and this expansion is correlative with the amount of gaseous occlusions in the material. The pressure to which the material is compressed in the measuring cylinder at the end of the intake stroke of the measuring piston is correlated with the volumetric displacement of the piston and the total volume in the cylinder at the end of the intake stroke of the piston such that the total expansion of the product in the cylinder will force an additional quantity of material from the cylinder to approximately compensate for the gaseous occlusions in the material at atmospheric pressure.

The material is advantageously fed into the measuring cylinder by a pump having a means for accurately controlling the pressure applied to the material. The pressure controlling means is preferably arranged to allow the material feed pump to stall, when the pressure in the measuring cylinder reaches a preselected pressure, to maintain the pressure on the product until the flow of material from the feed pump to the measuring piston is shut off, while minimizing or avoiding agitation of the material. The pump is conveniently in the form a reciprocating feed pump operated in timed relation with the reciprocation of the measuring piston, and the pressure limiting means comprises either a stall-type pump drive motor or a force limiting means between the pump drive motor and the feed piston to limit the pressure applied by the feed piston to the material.

An important object of this invention is to provide an improved method and apparatus for dispensing generally gravimetrically uniform charges of semi-fluid material containing gaseous occlusions in varying amounts utilizing a volumetric-type dispenser.

Another object of this invention is to provide a method and apparatus for dispensing semi-fluid material containing gaseous occlusions utilizing a volumetric-type dispenser, which is adapted for dispensing generally gravimetrically uniform charges over a relatively wide variation in the amount of gaseous occlusions in the material.

A more particular object of this invention is to provide an improved method and apparatus for volumetrically dispensing generally gravimetrically uniform charges of cottage cheese.

These, together with other objects and advantages of this invention will be more readily understood by reference to the following detailed description when taken in connection with the accompanying drawings wherein.

Figure 3:
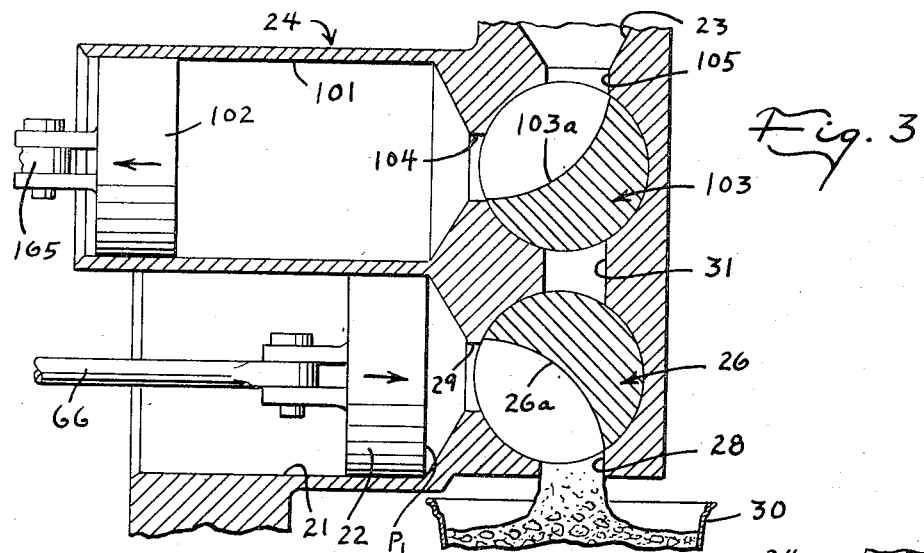
FIGS. 1, 2 and 3 are diagrammatic views illustrating different steps in the method of dispensing the material.

The invention relates to a method and apparatus for volumetrically dispensing compressible and expansible semi-fluid materials containing gaseous occlusions in varying amounts. The method and apparatus is particularly adapted for dispensing cottage cheese in which the amount of gaseous occlusions varies over a relatively wide range, for example about 6 to 8 percent or more, but is also adapted for dispensing other materials such as mayonnaise, cream cheese and the like which contain gaseous occlusions. When such materials containing gaseous occlusions in varying amounts are dispensed by volumetric-type dispenser operating at atmospheric pressure, the volume of pure product dispensed, that is the volume of product without gaseous occlusions, varies in proportion to the variation in the amount of gaseous occlusions, and there is accordingly a substantial variation in the weight of the material dispensed. Marked improvement in uniformity of the weight of material containing gaseous occlusions dispensed by a volumetric-type filler is achieved by compressing the material in the measuring cylinder to a pressure substantially above atmospheric pressure.

In general, the semi-fluid material containing gaseous occlusions is volumetrically dispensed utilizing a volumetric dispenser having a measuring cylinder 21 and a measuring piston 22 which is reciprocable in the cylinder from an initial position designated $P_1$, in an intake stroke of preselected volumetric displacement, to a second displaced position designated $P_2$. Semifluid material such as cottage cheese containing gaseous occlusions in varying amounts is fed from a supply source such as a hopper 23, by a material feed mechanism comprising a pump means 24 into the measuring cylinder 21 during the intake stroke of the measuring piston, and the pump means is arranged to control the pressure applied to the material as it is fed to the measuring cylinder to a preselected pressure substantially above atmospheric pressure to compress the material in the measuring cylinder. A measuring valve mechanism 26 is operated in timed relation with the movement of the measuring piston 22 to communicate the measuring cylinder with the feed mechanism during the intake stroke of the measuring cylinder, and to shut off the flow of material to the measuring cylinder at the end of the intake stroke and while the pressure in the measuring cylinder is at the preselected super-atmospheric pressure. The valve means 26 is then operated to communicate the measuring cylinder with an atmospherically vented dispensing outlet 28 to allow discharge of the material from the measuring cylinder into an atmospherically vented receiver 30. In order to reduce spurting of material from the dispensing outlet, when operating at high pressures, the measuring piston 22 can be retraced from position $P_2$ to a position such as $P_r'$ (FIG. 2) after the flow of material into the cylinder is shut off, sufficient to allow at least partial expansion of the product and reduction of the pressure in the measuring cylinder, before communicating the measuring cylinder with the discharge outlet. The receivers 30 are advanced past the filling station in timed relation with the operation of the dispenser by a transfer mechanism of any suitable type, one form of which is described hereinafter, so that the dispensing mechanism dispenses the measured charge of material into successive receivers during successive dispensing cycles.

Figure 1:
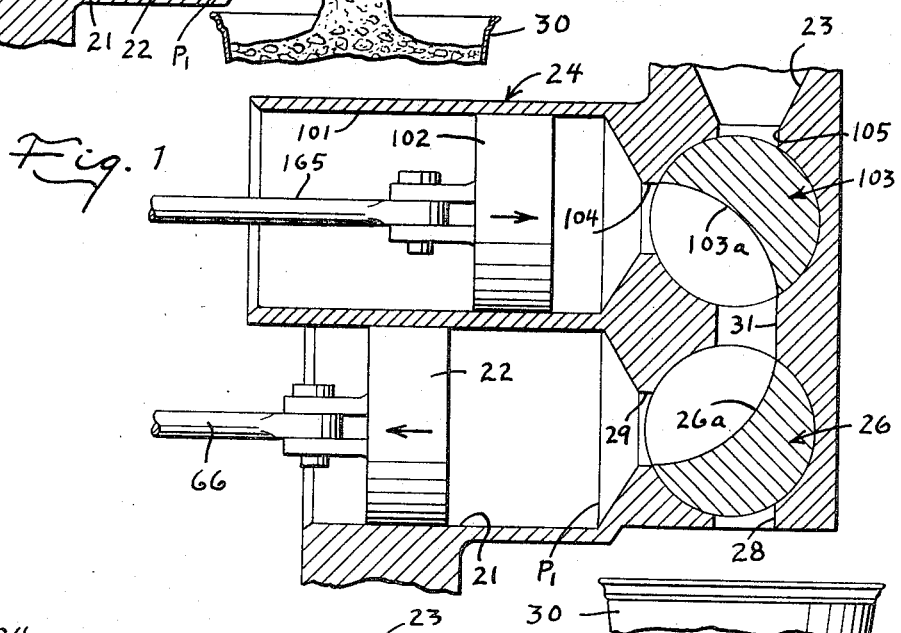
Figure 2:
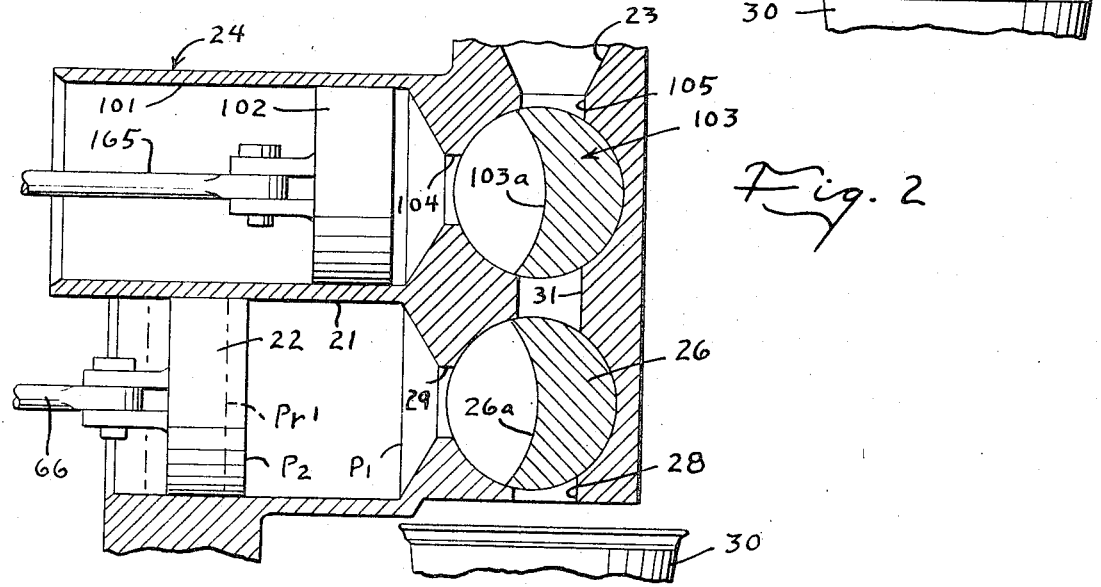

In the form of the volumetric dispenser illustrated, the valve 26 is of the rotary three-way type which has a transfer passage 26a intermediate its ends and which is movable from a position as shown in FIG. 1 communicating the cylinder port 29 with an inlet port 31, to an intermediate position as shown in FIG. 2 blocking the cylinder port 29, to a discharge position as shown in FIG. 3 communicating the cylinder port 29 with the discharge outlet 28.

The piston 22 moves through a preselected volumetric displacement as it moves from its initial position $P_1$ in an intake stroke to the position $P_2$, which volumetric displacement is a function of the diameter of the cylinder and the stroke of the piston in its intake stroke, and is hereinafter sometimes referred to as Vd. This volumetric displacement is preferably made adjustable in a manner and for a purpose described hereinafter. As previously described, the valve 26 is moved from its intake position to a closed position shown in FIG. 2 when the piston reaches the end of its intake stroke (position $P_2$) to momentarily trap a volume of the material containing the gaseous occlusions under the preselected super-atmospheric pressure produced by the material feed means 24. Thus, when the piston is in the closed position $P_2$ shown in FIG. 2, the valve passage 26a in effect forms a part of the total volume of the measuring chamber, which total volume exceeds the displacement volume Vd of the piston by a preselected amount, hereinafter sometimes referred to as the excess volume Ve. As will be seen from FIG. 2, the volume Ve is equal to the total volume in the chamber 21 and valve passage 26a when the valve and piston are in the position shown in FIG. 2, less the displacement valve $Vd$ of the measuring piston as it moves between positions $P_2$ and $P_1$. The relationship can be stated as follows:

$$(1) \quad Ve = Vt - Vd$$

where $Vt$ is the total volume in the measuring chamber when the piston is in the position $P_2$ at the end of its intake stroke and the valve 26 is in the closed position as shown in FIG. 2 shutting off flow of fluid material to or from the measuring chamber and trapping the material therein under the preselected super-atmospheric pressure.

When the valve 26 is thereafter moved to a position as shown in FIG. 3 to communicate the measuring cylinder with the dispensing outlet 28, and the measuring piston 22 is thereafter moved back to its initial position $P_1$, the volume of material dispensed will be a function of both the expansion of the material in the measuring chamber and the displacement of a portion of the material in the chamber by the measuring piston 22 as it moves from the position $P_2$ to $P_1$. The amount of pure product dispensed from the measuring chamber due to the combined expansion of the product in the chamber and the displacement of a portion of the product from the chamber by the measuring piston can be expressed by the following equation:

$$(2) \quad Vp = \underbrace{XaVd}_{(a)} + \underbrace{\frac{XaVd(1-Xa)(n-1)}{1+Xa(n-1)}}_{(b)} + \underbrace{\frac{XaVe(1-Xa)(n-1)}{1+Xa(n-1)}}_{(c)}$$

where $Vp$ is the volume of pure product or pure material dispensed, that is the volume of material without gaseous occlusions; $Xa$ is the proportion by volume at atmospheric pressure of pure product in the dispensed material containing gaseous occlusions; $Vd$ is the displacement of the measuring piston 22 as it moves from its initial position $P_1$ in an intake stroke to the position $P_2$; $n$ is the absolute pressure in atmospheres applied to the material in the measuring chamber at the end of the intake stroke; and $Ve$ is as defined in equation (1) above.

In equation (2) above, the bracketed portion designated (a) represents the volume of pure product which would be dispensed by the measuring piston 22 moving in the cylinder 21 from position $P_2$ to position $P_1$, if the material in the cylinder was at atmospheric pressure. As will be seen, as the proportion $Xa$ of pure product in the material decreases from one toward zero, the quantity $Xa\,Vd$ correspondingly decreases.

The second term of the equation which is bracketed and indicated by the letter (b) above represents the volume of pure product which would be displaced from the measuring chamber due to expansion of the volume $Vd$, when the pressure on the material is decreased from said preselected pressure of $n$ atmospheres to atmospheric pressure. As will be seen, this quantity varies as a function of the proportion $Xa$ of pure product in the material at atmospheric pressure; the displacement volume $Vd$, and the atmospheric pressure $n$ at which the material is compressed at the end of the intake stroke.

The quantity which is bracketed and designated (c) represents the volume of pure product which would be forced from the measuring chamber due to expansion of the excess volume $Ve$ in the measuring chamber. This quantity also varies as a function of the proportion $Xa$ of pure product in the material at atmospheric pressure; the pressure $n$ in atmospheres at which the material is compressed at the end of the intake stroke of the measuring piston, and the size of the excess volume $Ve$ in the measuring chamber.

As will be seen from the examination of equation (2), the quantities bracketed and designated (b) and (c) would be equal to zero if the pressure $n$ were equal to 1. Thus, at atmospheric pressure, the volume of pure product dispensed by the measuring piston moving through a displacement volume $Vd$ would decrease as the proportion $Xa$ of pure product in the material decreased, as graphically illustrated in FIG. 4 by the line designated $n = 1$. However, when the material in the measuring chamber is compressed to a pressure substantially above atmospheric pressure, the quantities bracketed and designated (b) and (c) in equation (2) become finite values that increases as $Xa$ increases, at least in the region where $Xa$ is greater than .5.

Figure 4:
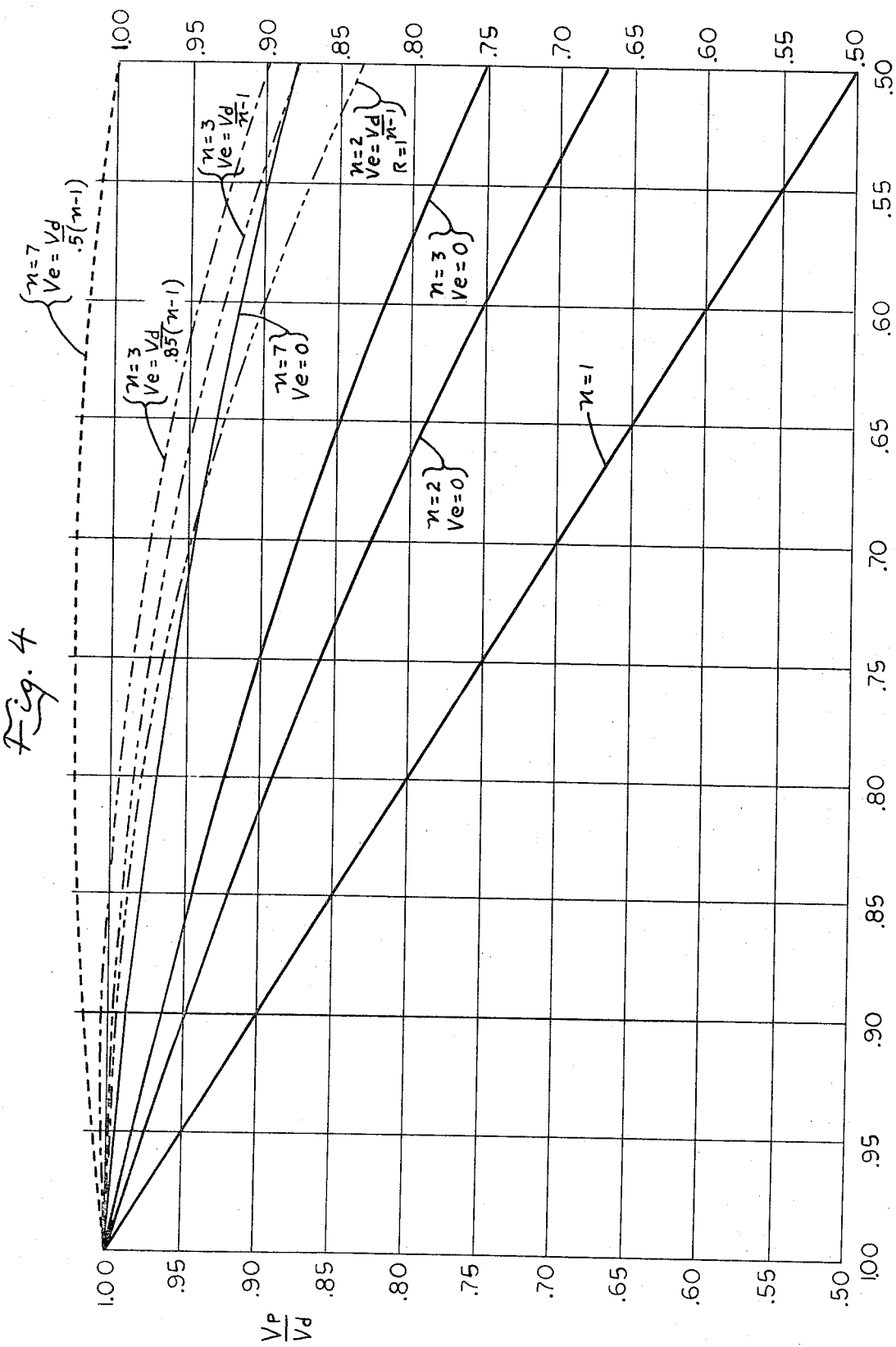
FIG. 4 is a graph illustrating the relationship between the amount of pure product dispensed with variations in the amount of gaseous occlusions in the product, under different operating conditions.

The manner in which the volume of pure product $Vp$ varies with changes in pressure $n$ on the product at the end of the intake stroke and variations in proportion $Xa$ of pure product in the material being dispensed, is graphically illustrated in FIG. 4. If the excess volume $Ve$ is zero, the amount of pure product dispensed at a pressure of two atmospheres is indicated by the curve designated $n = 2$, $Ve = 0$ and at three atmospheres by the curve $n = 3$, $Ve = 0$. Thus, the volume of pure product $Vp$ dispensed for a given displacement $Vd$ of the measuring piston is increased significantly by compressing the product in the measuring cylinder to at least two atmospheres and $Vp$ will more nearly approach the displacement volume $Vd$ as the pressure is further increased, for example as indicated by the line designated $n = 7$, $Ve = 0$ corresponding to 7 atmospheres or about 100 p.s.i.a. However, if $Ve$ equals zero, increasing pressure on the material in the measuring chamber can only cause $Vp$ to approach but never equal $Vd$, except at $Xa = 1$. The total volume $Vt$ of the measuring cylinder at the end of the intake stroke can be proportioned so that $Ve$ is greater than zero and such that the additional quantity of material forced from the measuring chamber due to the expansion of the material in the volume $Ve$ improves the overall characteristics of the dispenser to minimize fluctuations in the volume of pure product dispensed with variations in the proportion of pure product in the material.

It can be shown from equation (2) that $Vp$ would equal $Vd$ if:

$$(3) \quad Ve = Vd/Xa(n-1)$$

In equation 3, $Xa$ is of course the variation in the proportion of pure product in the material being dispensed and cannot be controlled. However, the accuracy of dispensing can be markedly improved if the volume $Ve$ is proportioned as follows:

$$(4) \quad Ve = Vd/R(n-1)$$

Where R is a constant between about 1 and about .5, and which is preferably selected in accordance with the average proportion of pure product in the material being dispensed. For example, if the proportion of pure product in the material being dispensed is relatively high in the range of 1 to about 0.9, R can be made equal to 1. Thus, if $n$ equals two atmospheres pressures and R equals 1, $Ve$ should equal $Vd$ and the volume of pure product dispensed will be substantially as shown by the curve labeled $n = 2$, $Ve = Vd/n-1$, in the graph of FIG. 4. If the pressure $n$ equals three atmospheres, and R equals 1, then the volume of product $Vp$ dispensed by the dispenser will substantially follow the curve designated $n = 3$, $Ve = Vd/n-1$, in the graph of FIG. 4. The volume $Ve$ is substantially the volume of material that remains in the measuring cylinder at the end of the discharge stroke and it is considered advantageous to limit the excess volume $Ve$ so as to preferably be no greater than the displacement volume $Vd$ of the measuring piston. From equation (4) above, it will be seen that the excess volume $Ve$ should be decreased as the pressure $n$ is increased and that the pressure $n$ should be at least two atmospheres if $Ve$ is to be less than $Vd$.

If the average proportion at atmospheric pressure of pure product in the material being dispensed is in a lower range, R can be selected accordingly so as to be less than one. The volume or product dispensed by the apparatus where $R = 0.85$ and the pressure $n = 3$ atmospheres is shown by the curve $n = 3$, $Vd = Vd/0.85(n-1)$, in the graph of FIG. 4. Another curve for $R = 0.5$ and the pressure $n = 7$ atmospheres is shown by the curve $n = 7$, $Ve = Vd/0.5(n-1)$ in FIG. 4. It will be seen from the curves $n = 3$, $Ve = Vd/0.85(n-1)$ and $n = 7$, $Ve = Vd/0.5(n-1)$, that the volume of pure product $Vp$ dispensed by the apparatus can be made greater than the displacement volume $Vd$ of the piston. This is considered advantageous particularly when operating with material in which the average proportion of pure product in the material is substantially below one. As will be seen from the graph of FIG. 4, in the curve $n = 3$, $Ve = Vd/0.85(n-1)$, the ratio $Vp/Vd$ exceeds one for values of $Xa$ between 1 and 0.85 and similarly, in the curve $n = 7$, $Ve = Vd/0.5(n-1)$ the ratio $Vp/Vd$ exceeds one for values of $Xa$ between 1 and 0.5. However, the rate of change of the curvature of these curves is very small approximately midway between the points where they cross the line $Vp/Vd = 1$.

As will be seen from equation (2) the volume of pure product dispensed will vary if the atmospheric pressure $n$ is changed during successive cycles of the dispensing apparatus, and the pump 24 is accordingly arranged to accurately control the pressure to which the material is compressed in the measuring chamber at the end of the intake stroke. This is advantageously effected by controlling the force applied to the pump so as to limit movement of the pump when the pressure reaches a preselected value. In general, this can be achieved by utilizing a pump drive motor of a type which can be driven to stall at a preselected load on the pump or by providing a yieldable coupling or connection between the pump drive motor and the pump which limits the force applied by the drive motor to the pump.

Figure 5:
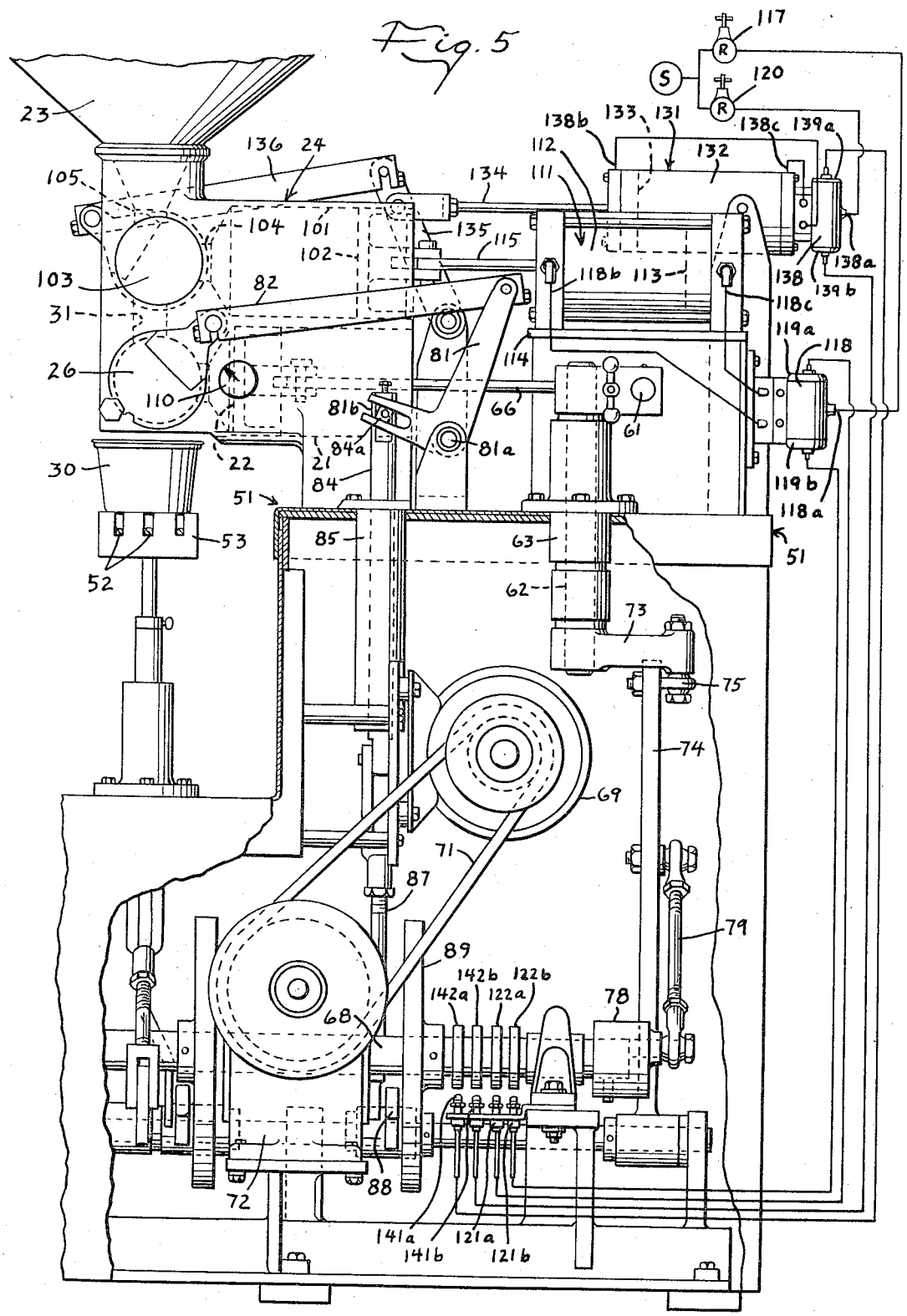
FIG. 5 is a fragmentary vertical sectional view of one form of apparatus for carrying out the present invention.
Figure 6:
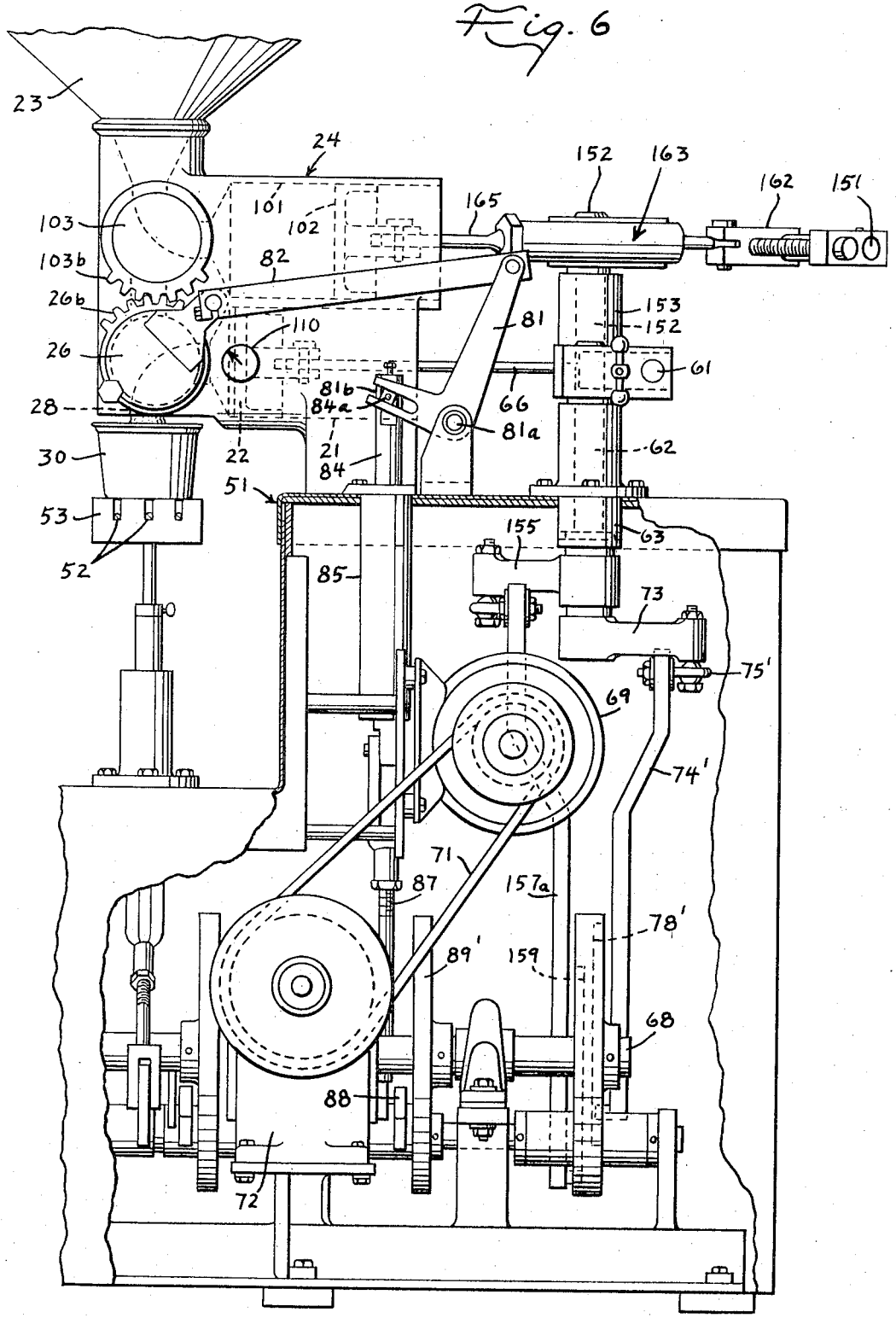
FIG. 6 is a fragmentary vertical sectional view through another form of apparatus for carrying out the invention.
Figure 7:
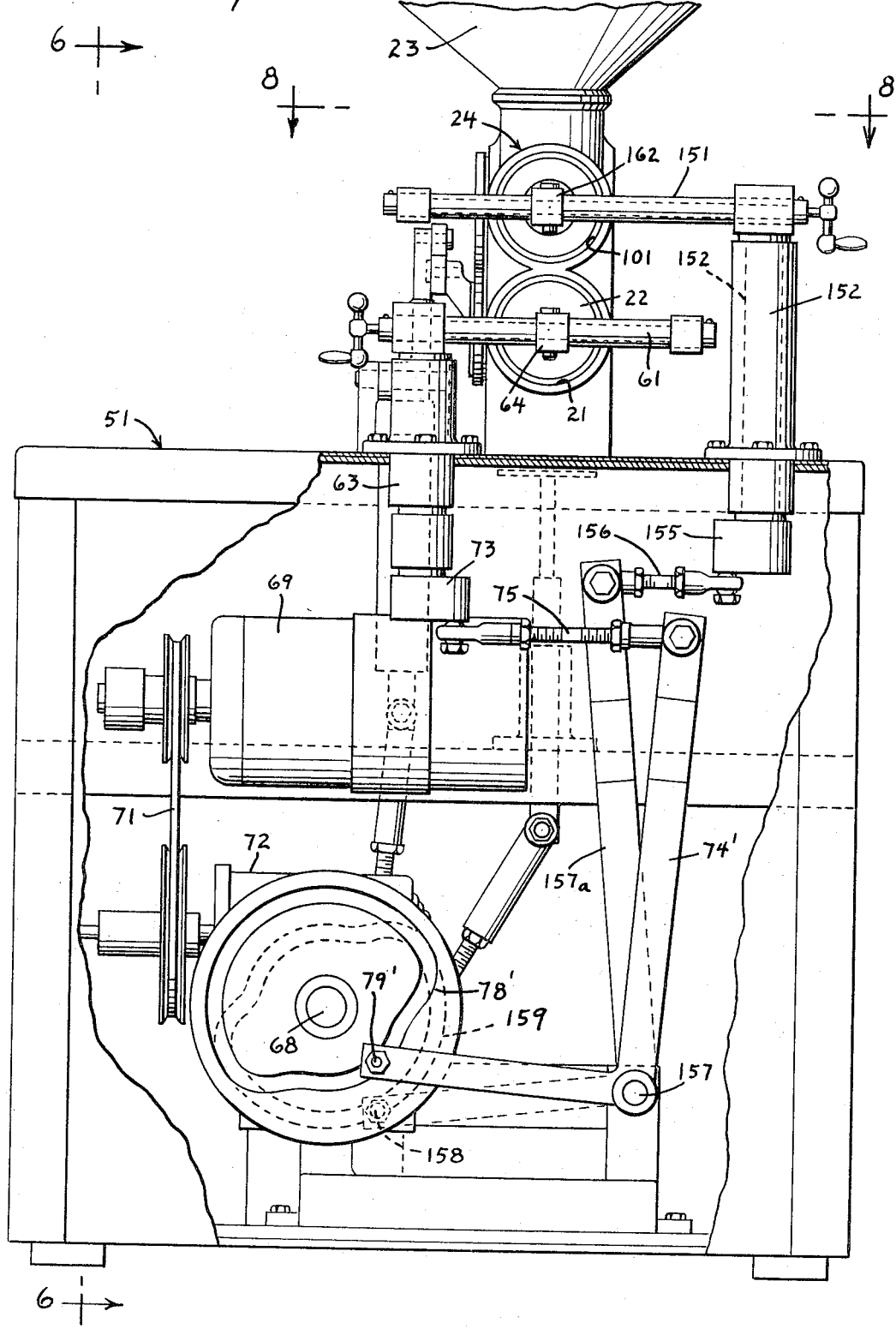
FIG. 7 is a fragmentary rear elevational view of the apparatus of FIG. 6.
Figure 8:
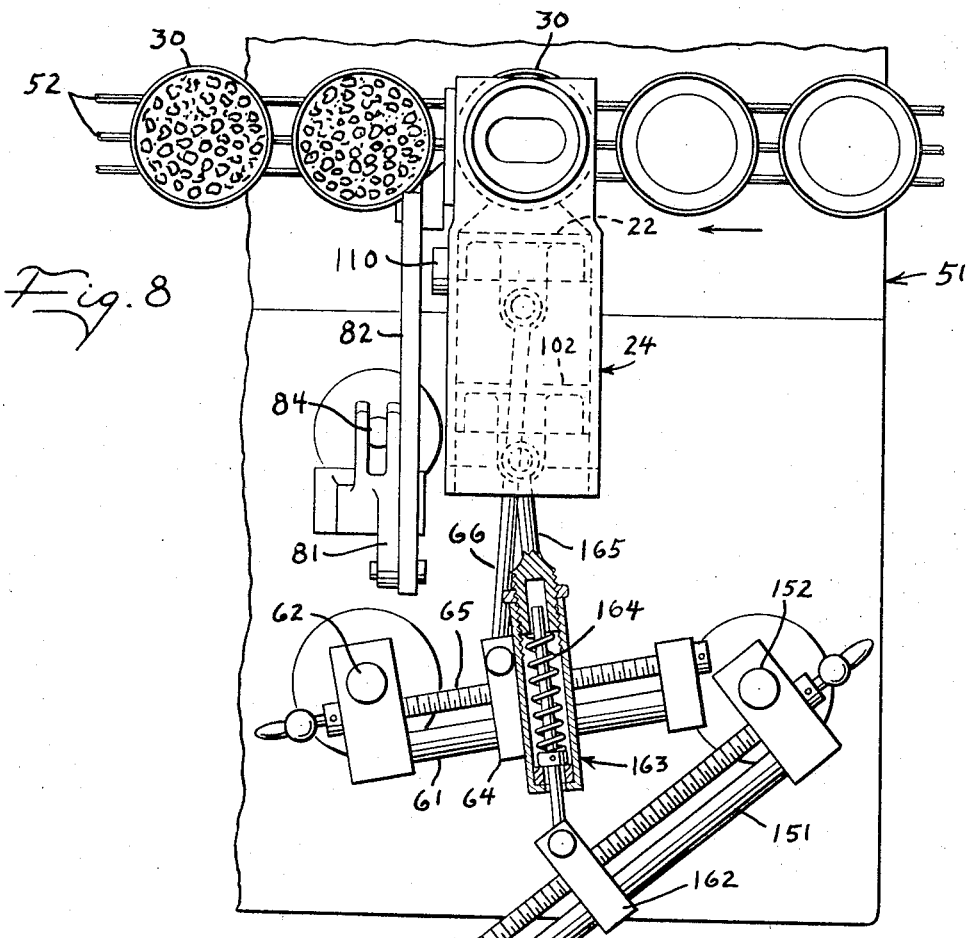
FIG. 8 is a fragmentary horizontal sectional view taken on the plane 8—8 of FIG. 7.

Apparatus suitable for practicing the invention is illustrated in FIGS. 5–8. The embodiment shown in FIG. 5 and the embodiment shown in FIGS. 6–8 are generally similar and the like numerals are used to designate corresponding parts.

The dispensing apparatus in general include a housing 51 for supporting the measuring cylinder and valve mechanism, and a conveyor 52 for advancing containers 30 past the dispenser in timed relation with the operation of the dispenser. The transfer mechanism for advancing containers in timed relation with the operation of the dispenser can be of various different known constructions and, in the embodiment shown, includes endless belts for advancing the containers 30 on their upper run. An elevator platform 53 can advantageously be provided at the dispensing station and operated in timed relation with the dispenser to elevate a container 30 off the conveyor and into a position closely underlying the dispensing outlet 28 of the dispenser.

The measuring piston 22 is cyclically reciprocated through a preferably adjustable displacement by means of an arm 61 (FIGS. 7 and 8) which is mounted for horizontal swinging movement about an upright shaft 62 rotatably supported on the housing by a bearing 63. A follower 64 is slidable along the arm 61 and is adjustably positioned therealong by a screw 65, the follower being connected through a connecting rod 66 to the measuring piston 22 to reciprocate the same in response to horizontal swinging movement of the arm 61.

The machine includes a main drive shaft 68 driven by a motor 69 through a preferably adjustable speed belt drive 71 and speed reducing mechanism 72. In the embodiment of FIG. 5, the measuring piston is driven from a crank 78 on the main drive shaft 68, which crank is connected through a link 79, lever 74 and link 75 to an arm 73 on the lower end of the shaft 62 to effect a generally sinusoidal displacement of the measuring piston as indicated by the curve designated $Mp$ in FIG. 9, from the initial position $P_1$ to the displaced position $P_2$ and back to the initial position, as the crank 78 rotates through 360°. In the embodiment of FIGS. 6–8, the measuring piston is reciprocated by means of a cam 78' on the main drive shaft 68. A bell crank lever 74' has a follower 79' on one leg thereof that engages the cam 78' and the other leg of the bell crank lever 74' is connected through a link 75' to the lever 73 on the shaft 62. Cam 78' is advantageously shaped so as to move a measuring piston 22 through a modified sinusoidal displacement designated $Mp'$ in the graph of FIG. 10, from an initial position $P_1'$ to a displaced position $P_2'$ and then retract the measuring piston from position $P_2'$ to position $Pr'$ after the flow of material to the measuring cylinder is shut off and before the measuring piston is moved back to position $P_1'$, for a purpose discussed more fully hereinafter.

The valve 26 for controlling the flow of material into and out of the measuring cylinder is operated in timed relation with the reciprocation of the measuring piston. Valve 26 is conveniently of the rotary type and, in the embodiment of FIG. 5, is operated by a bell crank 81 pivotally supported at 81$a$ on the housing and having one leg connected through a link 82 to the valve 26 to oscillate the valve. The other leg of the bell crank 81 has a guide slot 81$b$ that receives a follower 84$a$ on a rod 84 that is mounted for vertical reciprocation in a bearing 85 on the housing. Rod 84 is cyclically reciprocated by a cam 89 on the main drive shaft 68, which cam drives a follower 88 connected through a link 87 to the rod.

Figure 9:
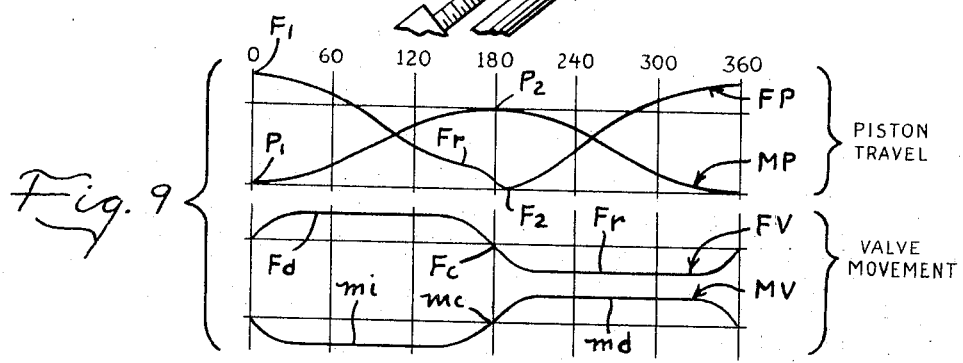
FIG. 9 is a series of graphs illustrating the cyclic movement of the pistons and valves of the apparatus of FIG. 5.
Figure 10:
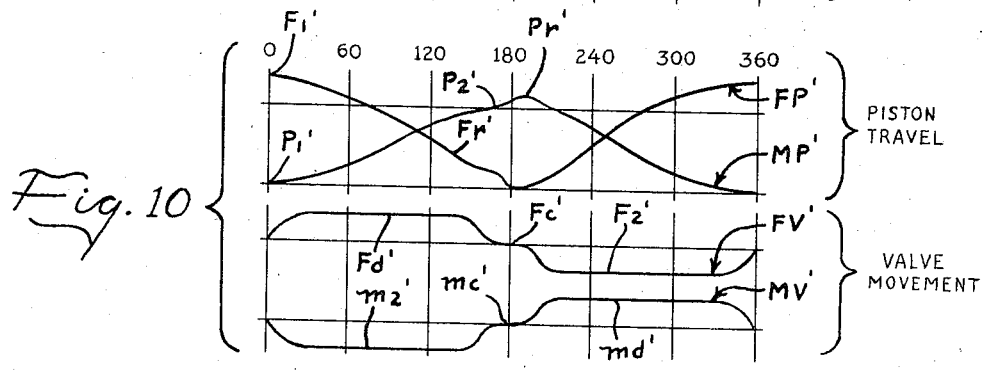
FIG. 10 is a series of graphs illustrating the cyclic movement of the pistons and valves of the dispensing apparatus of FIG. 6.

In the embodiment of FIG. 5, the cam 89 is shaped to move the valve 26 in the manner graphically illustrated by the curve MV in FIG. 9 to an intake position designated $mi$ as the measuring piston moves from a position $P_1$ to $P_2$, through a closed position $mc$ as shown in FIG. 2 when the measuring piston reaches the end of its intake stroke at position $P_2$, and to a dispense position indicated by the letters md in FIG. 9, as the measuring piston moves from position $P_2$ back to position $P_1$. In the embodiment of FIGS. 6–10, the valve operating cam 89' is arranged to move the valve through a somewhat modified motion as indicated by the curve MV' in FIG. 10. In general, the measuring piston valve in the embodiment of FIGS. 6–10 is moved to its intake position designated mi' during the intake stroke of the measuring piston, and then close the valve for a dwell period indicated at mc' before opening it to the dispense position md' during the discharge portion of the stroke of the measuring piston.

The dispensing apparatus also includes a pump means 24 for feeding the material into the measuring cylinder and a pump drive means which limits the pressure applied to the material being fed to the measuring cylinder to a preselected value. As previously described, control of the pressure applied to the material is advantageously effected by either utilizing a stall-type drive motor or a force limiting drive between the feed pump drive motor and the feed pump.

In the preferred embodiment illustrated, the material feed pump 24 is of the reciprocating piston type and includes a feed cylinder 101 and a material feed piston 102 which is reciprocable in the feed cylinder in alternate intake and discharge strokes. A feed valve means 103 is operated in timed relation with the feed piston to communicate the feed cylinder inlet 104 (FIGS. 1–3) with the material supply inlet 105 during the intake stroke of the feed piston, and to communicate the feed cylinder with the metering cylinder inlet passage 31 during the discharge stroke of the feed piston. As best shown in FIGS. 1–3, valve 103 is of the rotary type and has a transfer passage 103a.

In the embodiment of FIG. 5, the feed piston 102 is driven by a stall-type fluid motor 111. Motor 111 is herein shown of the linear fluid actuated type, such as in air operated or an hydraulically operated linear actuator having a cylinder 112 and piston 113. Cylinder 112 is mounted as by a bracket 114 on the housing 51 and the piston 113 is connected by a piston rod 115 to the feed piston 102. Fluid under pressure such as air is applied from a source designated S in FIG. 5 through a pressure regulator 117 and flow reversing valve 118 to opposite ends of the cylinder 112 to reciprocate the piston. Valve 118 has its inlet 118a connected to the outlet of the pressure regulator 117 and has controlled outlet lines 118b and 118c connected to opposite ends of the cylinder 112 of the fluid motor 111. Valve 118 is operated in timed relation with the movement of the measuring piston 22 to effect reciprocation of the feed piston approximately 180° out of phase with the measuring piston and, as shown, has valve operators 119a and 119b such as fluid or electric responsive operators, connected through lines to remote actuators 121a and 121b operated by cams 122a and 122b on the main shaft 68. In general, cams 122a and 122b are arranged so as to operate valve 118 and hence the motor 111 to move the feed piston 102 from a retracted position designated $F_1$ forwardly in a feed stroke as indicated by the curve designated FP in FIG. 9, while the measuring piston is moving in its intake stroke from position $P_1$ to $P_2$. The displacement of the feed piston during its discharge stroke as it moves forwardly from the position $F_1$, is made sufficiently greater than the displacement of the measuring piston during its intake stroke so that the feed piston positively forces material into the measuring cylinder under pressure. The pressure applied to the fluid motor 111 is controlled by the pressure regulator 117 and the latter is set to limit the pressure to a preselected value so that the pressure applied by the feed piston to the material being forced into the measuring cylinder is limited to a preselected pressure at the end of the intake stroke of the measuring piston. A pressure gauge 110 (FIG. 5) can be provided in the measuring cylinder to aid in setting the pressure applied to the material in the measuring cylinder. When the pressure in the measuring cylinder reaches a preselected pressure, the forward motion of the feed piston is interrupted as indicated by the curve portion Fr in FIG. 2. After the valve 103 has been moved back to its intake position, the pressure in the feed cylinder is again relieved to the supply hopper 23, and the piston continues in its forward motion to position $F_2$ until valve 118 is operated to reverse the application of fluid pressure to the motor 11 and retract the feed piston from the position $F_2$ to the position $F_1$.

The valve 103 in the embodiment of FIG. 5 is operated by a linear fluid actuator 131 including a cylinder 132 mounted on the housing 51 and a piston 133. The piston rod 134 is connected through lever 135 and link 136 to operate the valve 103 in response to the linear actuator 131. Actuator 131 is also operated in timed relation with the measuring piston by a valve 138 having its inlet 138a connected to the outlet of a pressure regulator 120 and controlled outlet lines 138b and 138c connected to opposite ends of the cylinder 132. Valve 138 has operators 139a and 139b which are operated by actuators 141a and 141b controlled by cams 142a and 142b on the main shaft 68. In general, the cams are arranged so as to operate valve 138 and hence the fluid actuator 131 to move the feed valve in the manner indicated by the curve designated FV in FIG. 9 so that the feed valve has moved its discharge position designated Fd during the forward stroke of the feed piston, to a closed position Fc at the end of the forward stroke, and to its intake position designated Fi during the return stroke of the feed piston. As previously described, the forward motion of the feed piston is retarded when the pressure in the metering cylinder reaches a preselected pressure determined by the setting of the regulator 117 as indicated at Fr in FIG. 9 and, when the feed valve is moved from its discharge position to its intake position, it vents the feed cylinder back to the supply hopper so that the pressure in the feed cylinder is then relieved and the feed piston completes its forward motion to position $F_2$ before being retracted back to the position $F_1$.

In the embodiment of FIGS. 6–8 the feed piston is mechanically reciprocated by a cam in timed relation with the movement of the measuring piston and a force limiting connection is used between the drive and the feed piston to control the pressure applied to the material in the measuring cylinder. More particularly, the feed piston is operated by a horizontally swingable arm 151 connected to an upright shaft 152 journaled by a bearing 153 on the housing 51. Shaft 152 has a lever 155 on its lower end connected through a link 156 to one leg 157a of a bell crank lever that is pivoted at 157 adjacent the lower end of the housing. The other leg 157b has a follower 158 that engages a cam 159 on the main drive shaft 68.

A follower 162 is provided on the arm 151 and the follower is connected through a yieldable coupling 163 to the piston rod 165 on the feed piston 102. In the embodiment shown, the yieldable coupling 163 includes a spring 164 interposed between the follower 162 and the piston rod 165 and selected to yield when the pressure on the material in the measuring cylinder reaches a preselected value. The cam 159 is arranged to cyclically reciprocate the feed piston through a stroke as indicated by the curve designated FP' in FIG. 10 from a retracted position $F_1'$ forwardly during the return stroke of the measuring piston. The displacement of the feed piston is made greater than that of the measuring piston during the intake stroke of the latter sufficient to force material under pressure into the measuring cylinder and, when the pressure in the measuring cylinder builds up to a preselected value determined by the force limiting spring 164, the spring yields and limits further movement of the feed piston, as indicated at $Fr'$ in FIG. 10. The feed valve 103 is operated in timed relation with the valve 26 and, as best shown in FIG. 6, valve 26 has a gear sector 26b that meshes with a gear sector 103b on the feed valve to move the feed valve to its discharge position $Fd'$ when the measuring valve is in its intake position and conversely, to move the feed valve to its intake position $F_2'$ when the measuring valve is in its discharge position. As previously described, the cam 89' for operating the measuring valve is arranged to maintain the measuring valve in a closed position for a dwell period designated $mc'$ in the curves of FIG. 10 and the cam 89' will similarly close feed valve 103 for a dwell period designated FC' in FIG. 10. In order to minimize spurting of material from the dispensing outlet 28 when the measuring valve 26 is moved to its dispensed position, particularly if the material is compressed in the measuring cylinder to a relatively high pressure, the cam 78' for operating the measuring piston can be advantageously shaped to move the measuring piston 22 from its initial position $P_1'$ to a displaced position $P_2'$ while the measuring valve 26 is in its intake position $m2'$, and to thereafter retract the measuring piston a short distance beyond the position $P_2'$, after the measuring piston valve 26 has been closed as indicated at $mc'$ in FIG. 10, to allow the material in the measuring cylinder to expand at least partially before the measuring cylinder valve 26 is moved to its discharge position $md'$ to discharge the material into the receptacle. Similarly, in order to minimize backflow of material into the hopper when the feed valve is opened, the cam 159 for operating the feed piston is also advantageously arranged to retract the feed piston a short distance after the feed valve 103 is closed as indicated at FC' in FIG. 10, to reduce the pressure in the feed cylinder before moving the feed valve to its intake position $F_2'$.

From the foregoing it is thought that the method and apparatus of the present invention will be readily understood. The method and apparatus is adapted for dispensing semi-fluid materials containing gaseous occlusions in varying amounts and achieves marked improvement in the accuracy of the dispensing operation by compressing the product in the measuring cylinder to a preselected pressure at the end of the intake stroke of the measuring piston. With this arrangement, the volume of material dispensed is a function of both the stroke of the measuring piston and the expansion of the material in the measuring chamber upon subsequent dispensing of the material into atmospherically vented receivers. The pressure applied to the material in the measuring chamber is correlated with the displacement of the measuring piston during its intake stroke and the total volume in the measuring chamber such that the expansion of the material when the pressure is subsequently reduced to atmospheric pressure, substantially compensates for the gaseous occlusions in the material at atmospheric pressure.

The method and apparatus is particularly adapted for dispensing cottage cheese in which the gaseous occlusions vary over a relatively wide range and comprise about one to eight percent by volume of the cottage cheese at atmospheric pressure. Stated otherwise, the cottage cheese at atmospheric pressure, varies from about 91 to 98 percent pure cottage cheese. By compressing the cottage cheese to above-atmospheric pressure in the measuring chamber and correlating the pressure $n$ with total volume of the measuring chamber and the volumetric displacement $Vd$, such that the ratio $Vd/Ve(n-1)$ is in a range from about 1 to about 0.85, the variations in weight of the cottage cheese dispensed were reduced to about $\pm 2$ to 4 grams in one pound or less than $\pm 1$ percent variation by weight.

The method and apparatus is also adapted for dispensing other compressible and expansible semi-fluid materials containing gaseous occlusions in varying amounts. For materials which contain a relatively high average proportion by volume of gaseous occlusions, it will be seen from equation (2) and the graphs of FIG. 4, that improved accuracy in dispensing the material can be achieved by correlating the pressure $n$ with the total volume in the measuring chamber and the volumetric displacement of the measuring piston such that the ratio $Vd/Ve(n-1)$ is substantially less the one.

The embodiments of the invention in which an exclusive property or privilege is claimed are defined as follows:

1. A method of dispensing successive generally gravimetrically uniform charges of semi-fluid material containing varying amounts of gaseous occlusions, from a supply source into atmospherically vented receivers, utilizing a volumetric type dispenser having a measuring chamber and a measuring piston movable in the chamber comprising cyclically: moving the measuring piston from an initial position in an intake stroke of preselected volumetric displacement to a second position to expand the volume of the measuring chamber from a first preselected volume to a second preselected volume, feeding semi-fluid material containing gaseous occlusions from the supply source under pressure into the measuring cylinder during the intake stroke of the measuring piston and until the pressure on the material and gaseous occlusions in the measuring chamber reaches a preselected pressure of at least two atmospheres at the end of the intake stroke of the piston, shutting off flow of material containing gaseous occlusions into the measuring chamber at the end of the intake stroke of the piston and trapping the material and the gaseous occlusions in the measuring chamber at said preselected pressure, thereafter communicating the measuring chamber only with an atmospherically vented receiver and moving the piston through a discharge stroke back to its initial position whereby the volumetric expansion of the material containing gaseous occlusions in the measuring chamber, when the pressure on the material is decreased to atmospheric pressure, causes the volume of material containing gaseous occlusions dispensed at atmospheric pressure into a receiver to exceed said preselected volumetric displacement of the piston during its intake stroke by an amount that increases and decreases respectively with increases and decreases in the amount of gaseous occlusions in the material supplied to the measuring chamber, setting said preselected pressure in relation to said second preselected volume in the measuring chamber so that the amount of material dispensed into a receiver due to said volumetric expansion of the material containing gaseous occlusions will approximately compensate for the gaseous occlusions in the material at atmospheric pressure, and repeating the cycle using the same initial position of the piston, the same preselected volumetric displacement of the piston in its intake stroke, and the same preselected pressure at the end of the intake stroke of the piston during each successive cycle to dispense successive generally gravimetrically uniform charges.

2. A method of dispensing successive generally gravimetrically uniform charges of semi-fluid material according to claim 1 wherein said preselected pressure is greater than three atmospheres.

3. A method of dispensing generally gravimetrically uniform charges of semi-fluid material according to claim 1 wherein said material is cottage cheese.

4. A method of dispensing successive generally gravimetrically uniform charges of semi-fluid material according to claim 1 including setting said initial position of the piston such that the total volume in the measuring chamber at the end of the intake stroke of the piston exceeds said preselected volumetric displacement of the measuring piston in its intake stroke by an amount greater than zero and less than one times said preselected volumetric displacement.

5. A method of dispensing successive generally gravimetrically uniform charges of semi-fluid material according to claim 1 including setting said preselected pressure in relation to said initial position of the piston and said preselected volumetric displacement such that $Ve$ is at least equal to $Vd/n-1$, where $Vd$ is said preselected volumetric displacement of said piston in its intake stroke; $Ve$ is the amount by which the total volume of the measuring chamber exceeds said displacement volume at the end of the intake stroke of the piston, and $n$ is said preselected pressure in atmospheres.

6. A method of dispensing successive generally gravimetrically uniform charges of semi-fluid material according to claim 1 including setting said preselected pressure in relation to said preselected volumetric displacement of the piston and said initial position such that the ratio $Vd/Ve(n-1)$ is in a range from about 1 to 0.5 where $Vd$ is said preselected volumetric displacement of the piston in its intake stroke; $n$ in said preselected pressure in atmospheres, and $Ve$ is the total volume in the chamber at the end of the intake stroke of the measuring piston less said preselected volumetric displacement $Vd$ of the piston.

7. A method of dispensing successive generally gravimetrically uniform charges of semi-fluid material containing gaseous occlusions according to claim 1 including setting said preselected pressure in relation to said preselected volumetric displacement of the piston and said initial position of the piston such that the ratio $Vd/Ve(n-1)$ is in a range of from about 1 to 0.5 times the average proportion by volume and at atmospheric pressure of non-gaseous material in the semi-fluid material containing gaseous occlusions to be dispensed, where $Vd$ is said preselected volumetric displacement of the measuring piston in its intake stroke; $Ve$ is the total volume in the measuring chamber at the end of the intake stroke less said preselected volumetric displacement $Vd$ of the piston, and $n$ is said preselected pressure in atmospheres.

8. A method of dispensing successive generally gravimetrically uniform charges of semi-fluid material containing gaseous occlusions according to claim 1 wherein said preselected volumetric displacement of said piston in its intake stroke is selected so as to be substantially equal to the volume of the material required to provide a charge of the desired weight in the absence of said gaseous occlusions, and setting said preselected pressure such that the weight of the total volume of material containing gaseous occlusions dispensed at atmospheric pressure into a receiver during each cycle is substantially equal to said desired weight.

9. A method of dispensing successive generally gravimetrically uniform charges of semi-fluid material containing gaseous occlusions according to claim 1 wherein said preselected volumetric displacement of said piston in its intake stroke is selected so as to be no greater than the desired weight of the charge divided by the density of the material without gaseous occlusions, and setting said preselected pressure in relation to the volume in the measuring chamber when the piston is in said initial position such that the weight of the total volume of material containing gaseous occlusions dispensed at atmospheric pressure into a receiver during each cycle is substantially equal to said desired weight of the charge.

10. A method of cyclically dispensing generally gravimetrically uniform charges of semi-fluid material containing varying amounts of gaseous occlusions, from a supply source into successive atmospherically vented receivers utilizing a volumetric type dispenser having a measuring chamber and a measuring piston movable in the chamber comprising, cyclically moving the measuring piston from an initial position through an intake stroke and thereafter moving the piston back to its initial position, setting said intake stroke to a preselected volumetric displacement substantially equal to the desired weight of the charge divided by the density of the material in the absence of said gaseous occlusions, setting said initial position to define a preselected reserve volume in the chamber when the piston is in said initial position, feeding material containing gaseous occlusions from the supply source under pressure into the measuring chamber during the intake stroke of the measuring piston until the pressure on the material and gaseous occlusions at the end of the intake stroke of the piston reaches a preselected pressure substantially above atmospheric pressure to compress the gaseous occlusions in the material, shutting off feeding of material containing gaseous occlusions to the chamber after the end of the intake stroke of the piston and trapping the material and gaseous occlusions in the measuring chamber at said preselected pressure, venting the measuring chamber only into an atmospherically vented receiver while the measuring piston moves back to its initial position whereby the total volume of material containing gaseous occlusions dispensed at atmospheric pressure exceeds said preselected volumetric displacement of the measuring piston by the volumetric expansion of the material in the measuring chamber when the pressure is decreased from said preselected pressure to atmospheric pressure, and setting said preselected pressure such that the weight of the total volume of material containing gaseous occlusions dispensed into a receiver during each cycle is substantially equal to the desired weight of the charge, and repeating the cycle using the same initial position of the piston, the same preselected volumetric displacement of the piston in its intake stroke, and the same preselected pressure at the end of the intake stroke of the piston during each successive cycle to dispense successive generally gravimetrically uniform charges.

11. A method of cyclically dispensing generally gravimetrically uniform charges of material according to claim 10 wherein said material is cottage cheese.

12. A method of dispensing successive generally gravimetrically uniform charges of semi-fluid material containing varying amounts of gaseous occlusions, from a supply source into successive atmospherically vented receivers, utilizing a volumetric type dispenser having a measuring chamber and a measuring piston movable in the chamber comprising cyclically: moving the measuring piston from an intake position in an intake stroke of preselected volumetric displacement, feeding semi-fluid material containing gaseous occlusions from the supply source into the measuring chamber during the intake stroke of the measuring piston and until the pressure on the material and gaseous occlusions reaches a preselected pressure substantially above atmospheric pressure, shutting off flow of material containing gaseous occlusions into the measuring chamber at the end of the intake stroke of the piston and trapping the material and gaseous occlusions in the chamber at said preselected pressure, thereafter communicating the measuring chamber only with an atmospherically vented receiver and moving the piston through a discharge stroke back to its initial position, and setting said preselected pressure, and said preselected volumetric displacement and said initial position of the piston such that the ratio $Vd/Ve(n-1)$ is in a range from about 1 to 0.5, where $Vd$ is said preselected volumetric displacement of the piston; $Ve$ is the total volume of the measuring chamber at the end of the intake stroke less said preselected volumetric displacement of the piston, and $n$ is said preselected pressure in atmospheres, and repeating the cycle using the same initial position of the piston, the same preselected volumetric displacement of the piston in its intake stroke, and the same preselected pressure at the end of the intake stroke of the piston during each successive cycle to dispense successive generally gravimetrically uniform charges.

13. A method of dispensing successive generally gravimetrically uniform charges of semi-fluid material containing gaseous occlusions according to claim 12 including the step of moving the measuring piston from said second position in a direction away from said initial position, after said piston has completed its intake stroke and the supply of material to the measuring chamber has been shut off, to decrease the pressure in the chamber and allow the material to at least partially expand before communicating the chamber with the atmospherically vented receiver.

14. A method of dispensing successive generally gravimetrically uniform charges of semi-fluid material containing gaseous occlusions according to claim 12 wherein said ratio is less than the ratio of the apparent density of the material containing gaseous occlusions to the actual density of the material in the absence of said gaseous occlusions.

15. A method of dispensing successive generally gravimetrically uniform charges of semi-fluid material containing varying amounts of gaseous occlusions, from a supply source into successive atmospherically vented receivers comprising, feeding the material containing gaseous occlusions under pressure from the supply source into a measuring chamber while expanding the volume of the measuring chamber from a first preselected volume to a second larger volume and interrupting feeding of material to the measuring chamber after it has been expanded to said second volume and the pressure on the material and gaseous occlusions in the chamber reaches a preselected pressure substantially above atmospheric pressure, to thereby compress the material and gaseous occlusions in the chamber, trapping the material and gaseous occlusions in the measuring chamber at said preselected pressure and thereafter communicating the measuring chamber only with an atmospherically vented receiver and decreasing the volume of the measuring chamber from said second volume back to said first volume to dispense a volume of the material containing gaseous occlusions at atmospheric pressure into the receiver which exceeds the change in volume of the measuring chamber between said first and second volumes by an amount that varies with the amount of the gaseous occlusions in the material feed to the measuring chamber, and setting said preselected pressure in relation to said first preselected volume and said second preselected volume such that the ratio $Vd/Ve(n-1)$ is less than 1, where $Ve$ is said first preselected volume, $n$ is said preselected pressure in atmospheres, and $Vd$ is the difference between said second preselected volume and said first preselected volume and repeating the cycle using the same first preselected volume, the same second larger volume, and the same preselected pressure during each successive cycle to dispense generally gravimetrically uniform charges.

16. A method of cyclically dispensing generally gravimetrically uniform charges of semi-fluid material containing varying amounts of gaseous occlusions, from an atmospherically vented hopper into atmospherically vented receivers utilizing a volumetric type dispenser having a measuring chamber and a measuring piston movable in the chamber comprising cyclically: withdrawing a volume of the material containing gaseous occlusions from the hopper in excess of the volume to the dispensed, moving the measuring piston from an initial position in an intake stroke of preselected volumetric displacement while simultaneously forcing the withdrawn volume under pressure into the measuring chamber until the pressure in the chamber reaches a preselected pressure of at least two atmospheres at the end of the intake stroke, shutting off flow of withdrawn volume of material containing gaseous occlusions into the measuring chamber at the end of the intake stroke of the piston and trapping the material and gaseous occlusions in the chamber at said preselected pressure, thereafter communicating the measuring chamber only with an atmospherically vented receiver and moving the piston through a discharge stroke back to said initial position, whereby the volume of material containing gaseous occlusions dispensed at atmospheric pressure exceeds said preselected volumetric displacement of the piston during its intake stroke by an amount that increases and decreases respectively with increase and decreases in the amount of gaseous occlusions in the material supplied to the measuring chamber, and repeating the cycle using the same initial position of the piston, the same preselected volumetric displacement of the piston in its intake stroke, and the same preselected pressure at the end of the intake stroke of the piston during each successive cycle to dispense successive generally gravimetrically uniform charges.

17. An apparatus for dispensing successive generally gravimetrically uniform charges of semifluid material containing varying amounts of gaseous occlusions from a supply source through a dispensing outlet vented to atmosphere into successive atmospherically vented receivers, the apparatus comprising a volumetric type dispenser having a measuring cylinder and a measuring piston movable in the cylinder, piston drive means for cyclically moving said piston from an initial position through a preselected intake stroke and for thereafter moving the piston in a discharge stroke back to said initial position, said piston when in its initial position defining a preselected reserve volume in the cylinder, pump means for feeding material from the supply source under a preselected pressure of at least two atmospheres into said measuring cylinder during the intake stroke of the measuring piston, valve means comprising the sole means for controlling flow of material into and out of the measuring cylinder, means for operating said valve means in timed relation with the movement of said measuring piston to shut-off flow of the material into the measuring cylinder at the end of the intake stroke and trap the material in the cylinder at said preselected pressure and for thereafter communicating said measuring cylinder only with said dispensing outlet during said discharge stroke of said piston to discharge material out of the measuring cylinder, and means for controlling said preselected pressure applied by said pump means to maintain said preselected pressure substantially constant during successive cycles, said means for controlling said preselected pressure including a stall-type drive motor for driving said pump means until the pressure applied by the pump means reaches said preselected pressure.

18. An apparatus for dispensing successive generally gravimetrically uniform charges of semi-fluid material containing varying amounts of gaseous occlusions from a supply source through a dispensing outlet vented to atmosphere into successive atmospherically vented receivers, the apparatus comprising a volumetric type dispenser having a measuring cylinder and a measuring piston movable in the cylinder, piston drive means for cyclically moving said piston from an initial position through a preselected intake stroke and for thereafter moving the piston in a discharge stroke back to said initial position, said piston when in its initial position defining a preselected reserve volume in the cylinder, pump means for feeding material from the supply source under a preselected pressure of at least two atmospheres into said measuring cylinder during the intake stroke of the measuring piston, valve means comprising the sole means for controlling flow of material into and out of the measuring cylinder, means for operating said valve means in timed relation with the movement of said measuring piston to shut-off flow of the material into the measuring cylinder at the end of the intake stroke and trap the material in the cylinder at said preselected pressure and for thereafter communicating said measuring cylinder only with said dispensing outlet during said discharge stroke of said piston to discharge material out of the measuring cylinder, and means for controlling said preselected pressure applied by said pump means to maintain said preselected pressure substantially constant during successive cycles said means for controlling said preselected pressure including a pump drive motor, and a force limiting coupling between said drive motor and said pump means for limiting the pressure applied by said pump means to the material in the measuring cylinder.

19. A volumetric-type dispensing apparatus for dispensing successive generally gravimetrically uniform charges of semi-fluid material containing varying amounts of gaseous occlusions from a supply source through a dispensing outlet vented to atmosphere into successive receivers, the apparatus comprising a measuring cylinder having a measuring piston reciprocable therein and a feed cylinder having a feed piston reciprocable therein, measuring piston drive means for cyclically moving the measuring piston from an initial position through a preselected intake stroke to draw a preselected volume of material into the measuring cylinder and for thereafter moving the measuring piston through a discharge stroke back to said initial position to discharge material from the measuring cylinder, feed piston drive means operative during said preselected intake stroke of the measuring piston to move the feed piston through a feed stroke correlated with the size of the feed piston to displace a volume greater than the displacement of said measuring piston during said preselected intake stroke, said feed piston drive means including means operative during the dispensing stroke of the measuring piston to move the feed piston in a suction stroke, valve means comprising the sole means for controlling flow of material into and out of said measuring chamber valve operating means for operating said valve means in timed relation to the reciprocation of the measuring piston to (a) communicate the measuring cylinder only with the feed cylinder during said preselected intake stroke of the measuring piston and to (b) communicate the feed cylinder only with the supply source, and the measuring cylinder only with the dispensing outlet, during said discharge stroke of the measuring piston, and means in said feed piston drive means for controlling the pressure applied by the feed piston to the material during the feed stroke to compress the material in the measuring cylinder during each intake stroke of the measuring piston at a preselected generally uniform pressure of at least two atmospheres.

20. A volumetric-type dispensing apparatus for dispensing successive charges of material according to claim 19 wherein said means for controlling the pressure applied to the material during the feed stroke of the feed piston includes means for limiting the force applied by said feed piston drive means to said feed piston during the feed stroke.

21. A volumetric-type dispensing apparatus for dispensing successive charges of material according to claim 19 wherein said feed piston drive means includes mechanical means reciprocated in timed relation with said measuring piston through a stroke greater than the stroke of the feed piston required to displace a volume corresponding to the displacement of the measuring piston during said preselected intake stroke, and yieldable means interposed between said mechanical means and said feed piston operative to yield and interrupt the stroke of the feed piston and limit the force applied by said mechanical means to the feed piston.

22. A volumetric-type dispensing apparatus for dispensing successive charges of material according to claim 19 wherein said feed piston drive means includes a linear fluid actuator reciprocable through a stroke greater than the stroke of the feed piston required to displace a volume corresponding to the displacement measuring piston during said preselected intake stroke, valve means operated in timed relation to said feed piston for controlling application of fluid pressure to said fluid actuator to cyclically reciprocate the same, and means for limiting the fluid pressure applied to said fluid actuator to a valve such that said linear actuator will stall during the feed stroke of the feed piston when the pressure on the material in the measuring chamber rises to said preselected generally uniform pressure.

23. An apparatus for volumetrically dispensing a measured charge of material according to claim 19 wherein said feed cylinder is disposed above said measuring cylinder.

* * * * *